G. H. LINDNER.
Sleeping-Cars.

No. 145,113. Patented Dec. 2, 1873.

2 Sheets--Sheet 2.
G. H. LINDNER.
Sleeping-Cars.
No. 145,113. Patented Dec. 2, 1873.
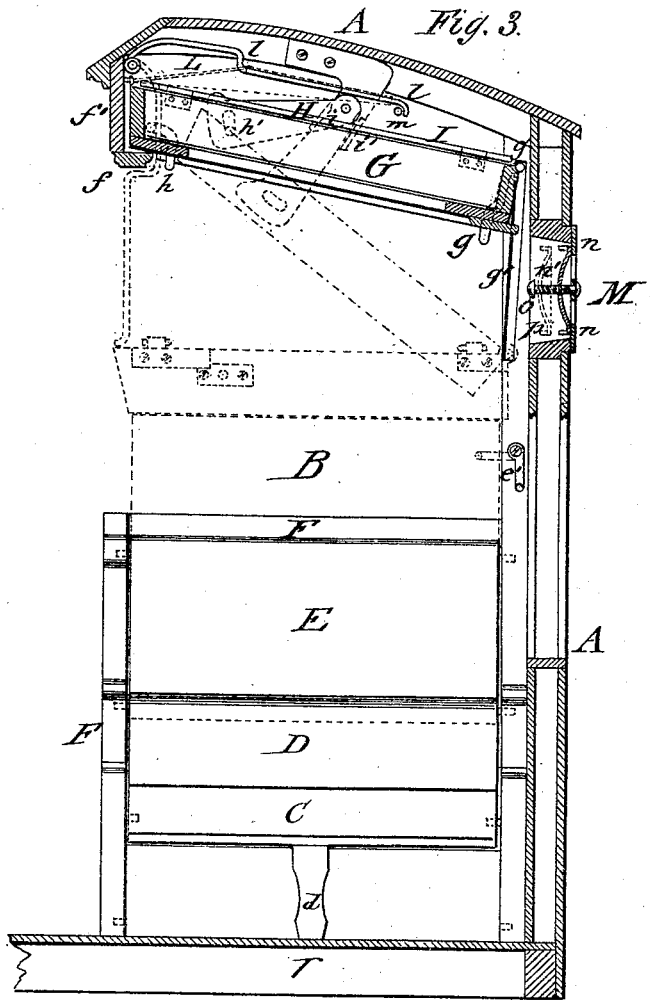
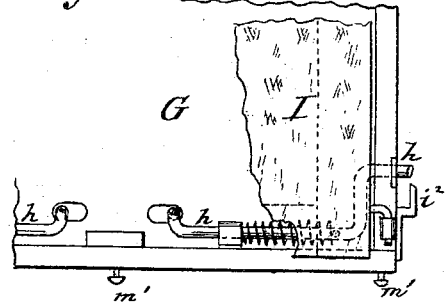
Witnesses:
Gustave Dieterich
E. Wolff
Inventor:
G. H. Lindner
Per
Attorneys.

UNITED STATES PATENT OFFICE.

G. HERRMANN LINDNER, OF BROOKLYN, NEW YORK.

IMPROVEMENT IN SLEEPING-CARS.

Specification forming part of Letters Patent No. 145,113, dated December 2, 1873; application filed June 28, 1873.

*To all whom it may concern:*

Figure 1:
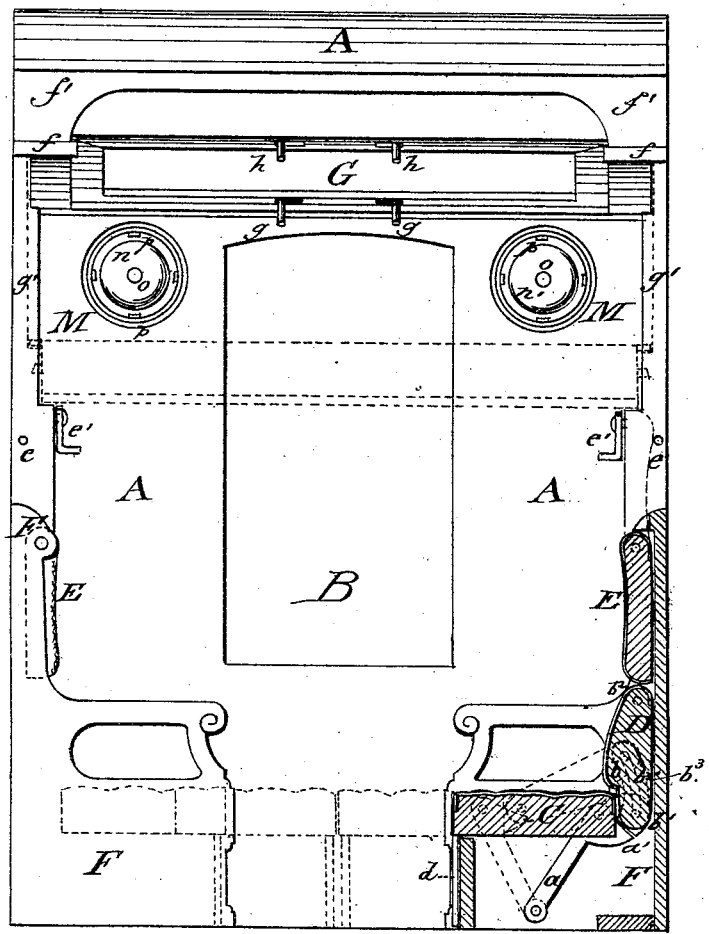
Figure 2:
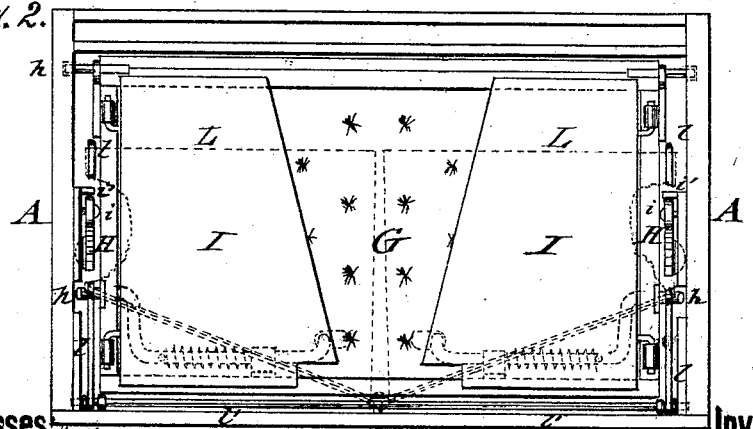

Be it known that I, G. HERRMANN LINDNER, of Brooklyn, in the county of Kings and State of New York, have invented a new and useful Improvement in Sleeping-Cars, of which the following is a specification:

In the accompanying drawing, Figure 1 represents a front elevation of a compartment of my improved sleeping-car, partly in section. Fig. 2 is a top view of the same, with the roof taken off to show the construction of the upper berth when folded away. Fig. 3 is a vertical transverse section of the same, in which dotted lines represent position of the sliding parts; and Fig. 4 is a detail horizontal view of a front corner of the upper berth.

The object of my invention is to construct a sleeping-car in such a manner that the different parts are arranged in strong, elegant, and convenient proportions, which may be quickly changed from seats to berths, and vice versa, obtaining more space in the height of the car, and securing a proper ventilation for the same.

In the drawing, A represents the frame of a sleeping-car, vessel, or other conveyance, constructed in the usual manner. It is divided into sections B, with seats and berths for passengers—the lower berths to be changed from the seats, the upper berths to be connected to the top of the car and let down for the night. The seats of the lower berths are constructed of three pivoted cushions, the main cushion C forming the seat, and cushions D E the back of the same. The seat C is pivoted at both sides, near the rear edge, to arms $a$, which are again pivoted to the sides of the seat-frame F, so that seat C can be swung out to form the middle part of the berth. A lug-shaped extension, $a'$, of each arm $a$ rests with its straight edge on the edge of socket $b$ of cushion D, limiting thereby the motion of seat C. A vertical support, $d$, which is placed centrally on the front part of seat C, supports the same when drawn out for the berth. Back cushion D is pivoted by bolts $b^1$ into sockets $b$, and is folded down into horizontal position into the place made vacant by seat C. By means of side pins $b^2$, cushion D is then resting upon and supported by lugs $a'$ of arms $a$. The sockets $b$ are provided with slightly-inclined slots $b^3$, in which bolts $b^1$ may slide, so that either cushion D may be slightly elevated into an inclined position for head-rest, and be secured therein by locking bolts $b^1$ into holes in the sides of the seat-frame. The top cushion E is also pivoted to frame F, to be turned up under an angle of one hundred and eighty degrees, and locked into that position by stop $e$ and pivoted lock-bolt $e'$, or its equivalent. The seat-frame F, dividing each section, extends slightly above the top cushion E when in position as back cushion, and allows thereby a full view of the car and a free passage of air through the same. When the top cushion is locked in its upward position it serves as support for the upper berth G. Berth G is arranged immediately under the top of the car, supported in front by the horizontal projections $f$ of facing $f'$ of frame A, and in the rear, alongside of frame A, by bolts $g$, which lock into nosings provided at the upper ends of guide-grooves $g'$. The grooves $g'$ extend vertically downward in frame A, and allow the sliding down of the rear part of berth G on bolts $g$ by withdrawing the same from the side nosings. Berth G is furthermore connected by front bolts $h$ with pendent arms H, which are pivoted at $i$ to a lateral piece of frame A, and provided at their lower ends with slots $h'$ for bolts $h$. A projecting side lug, $i^1$, arrests each arm H on its descent, while a similar lug, $i^2$, applied to the sides of berth G, facilitate the locking and disconnecting of bolt $h$ from arms H. A threefold support is thereby given to berth G while in position below the top of the car; securing its safety thereon. Bolts $g$ and $h$ are arranged mainly along the inside of berth G, to be out of sight, guided by staples, and bent in such a manner that they project with their ends through the sides of berth G at proper points to engage grooves $g'$ and arms H. The ends of bolts $g$ $h$, which project on the bottom or lower side of berth G and slide in slots of the same, are provided with suitable rings or buttons for the easy handling of the same, and, by spiral springs placed on the middle parts of bolts $g$ $h$, the side ends are forced outwardly to lock into their respective connecting parts.

When it is desired to lower the upper berth G, the rear bolts $g$ are withdrawn, so that the rear side of berth G slides down in grooves $g'$, while the front part swings in pendent arms H. The berth G assumes thereby an inclined position, as indicated in Fig. 3. The front bolts h are then withdrawn from pendent arms H, till berth G, swinging in bolts g as pivots, assumes a horizontal position, resting on the upturned top cushions E. The same operation is reversed when placing berth G back in its old position, the front and rear bolts locking by mere pressure, by the action of their spiral springs. The partitions I of the upper berths are hinged sidewise to berth G, and thrown up when arranged for the night. The upper curtains L are pivoted by rods l to a longitudinal connecting-rod, l', supported below the top of the car on facing f'. The rods l are bent to fit the frame A when in downward position for use, and rest on projecting pins m when turned up to be placed out of the way of berth G.

Buttons m', which are applied to the front part of the berth G, serve for suspending the curtains which close the lower berths.

The necessary mattresses and bedding may be stored in berth G, in the usual manner.

Having thus described my invention, I claim as new and desire to secure by Letters Patent—

1. In sleeping-cars, the combination of the seat-frame F, having cushion C, pivoted to arms a, and having leg d, with the back cushions D and E, substantially as described.

2. The pivoted arm a, having lug-shaped extension a', as and for the purpose set forth.

3. The car-frame A, having stop-pin e and pivoted bolt e' for locking top cushion E, so as to support the upper berth, as specified.

4. The berth G, having front and rear spring-bolts g and partitions I, in combination with frame A, having grooves g' and pendent arms H, for raising and lowering the same, as described.

5. The frame A, having lug i to arrest pendent arm H in its downward motion for the intermediate position of berth G, as set forth.

6. The rods l and longitudinal connecting-rod l', combined with an upper curtain, L, in the manner and for the purpose described.

G. HERRMANN LINDNER.

Witnesses:
 PAUL GOEPEL,
 ALEX. F. ROBERTS.